United States Patent
Fickert et al.

[11] Patent Number: 6,116,151
[45] Date of Patent: Sep. 12, 2000

[54] PRESSURE COOKER

[75] Inventors: Martin Fickert, Herrstein; Bernhard Graziel, Homburg/Saar; Arnold Thelen, Kempfeld, all of Germany

[73] Assignee: Fissler GmbH, Idar Oberstein, Germany

[21] Appl. No.: 09/331,960

[22] PCT Filed: Jan. 7, 1998

[86] PCT No.: PCT/EP98/00039

§ 371 Date: Jun. 30, 1999

§ 102(e) Date: Jun. 30, 1999

[87] PCT Pub. No.: WO98/33422

PCT Pub. Date: Aug. 6, 1998

[30] Foreign Application Priority Data

Feb. 1, 1997 [DE] Germany .......................... 197 03 765

[51] Int. Cl.[7] .............................. A47J 27/08; A47J 27/09; B65D 45/00; B65D 45/34

[52] U.S. Cl. ................................ 99/337; 99/340; 99/403; 220/316; 220/319; 220/912

[58] Field of Search ............................. 99/330, 337, 338, 99/342, 340, 403, 407; 220/203, 208, 209, 293, 298, 316, 319, 325, 912; 126/369, 377, 378, 373, 374, 388, 389; 292/256.67, 256.69

[56] References Cited

U.S. PATENT DOCUMENTS

| | | | |
|---|---|---|---|
| 1,501,203 | 7/1924 | Crossley | 292/256.69 |
| 1,894,280 | 1/1933 | Nelson | 220/319 X |
| 2,715,477 | 8/1955 | North | 220/320 X |
| 5,293,813 | 3/1994 | Schultz | 99/337 |
| 5,297,473 | 3/1994 | Thelen et al. | 99/403 X |
| 5,317,959 | 6/1994 | Beluzzi | 99/403 X |
| 5,385,257 | 1/1995 | Hung | 99/467 X |
| 5,427,014 | 6/1995 | Von Der Becke et al. | 99/403 X |
| 5,678,721 | 10/1997 | Cartigny et al. | 99/337 X |

FOREIGN PATENT DOCUMENTS

| | | |
|---|---|---|
| 1070063 | 7/1954 | France . |
| 2218009 | 9/1974 | France . |
| 32 32 907 | 8/1984 | Germany . |
| 4040489 | 7/1992 | Germany . |
| 295 00 222 | 3/1995 | Germany . |

*Primary Examiner*—Timothy Simone
*Attorney, Agent, or Firm*—Wenderoth, Lind & Ponack, L.L.P.

[57] ABSTRACT

The invention relates to a pressure cooker with a container that can be airtightly closed with the aid of a cover, which can be placed upon a container edge and locked with it. A closing mechanism is provided on the cover. The closing mechanism includes a total of four arcuate closure members, acting distributively over the periphery of the cover and pivoted on the periphery of the cover. The closing mechanism can be moved by an actuating device from an open position, in which the cover can be removed from the container, into a locked position to extend underneath the container edge. In the locked position, the cover is pressed at its periphery against the container edge by interspacing an encircling ring. The total (for example four) closure members are combined into (for example two) groups of two closure members each of which are connected with hinges. Two adjacent ends of the (for example two) groups of closure members with the aid of the closing mechanism are simultaneously guided obliquely inwardly toward one another during closing, and during opening, obliquely outwardly away from each other.

20 Claims, 2 Drawing Sheets

PRESSURE COOKER

BACKGROUND OF THE INVETION

1. Field of the Invention

The invention relates to a pressure cooker with a container intended for receiving items to be cooked. A cover, which can be placed on an outwardly bent container edge and which is lockable with it, can be airtightly closed by means of a closing mechanism provided on the cover. The closing mechanism includes at least two segment-like closure members, adapted arcuately to the circumferential contour of the container edge, distributed over the periphery of the cover, and pivoted on the periphery of the cover. The closing mechanism can be moved by an actuating device from an open position, in which the cover can be removed from the container, into a locked position to extend underneath the container edge. In the locked position the cover on its periphery is pressed against the container edge by an encircling sealing ring.

2. Description of the Prior Art

In a known pressure cooker (DE 40 40 489 C2) a stationary U-shaped holding segment is provided on a cover. Two arcuate clamping segments, which are spaced apart from the holding segment, are articulated on a pivot axis at the outer ends facing one another in the proximity of the holding segment. The holding segment and the clamping segments form a substantially circular arrangement. The holding segment extends under the edge (turned outwardly) of the container and thus aligns the cover with the container so that the clamping segments extend under the turned-over edge. Opposite the holding segment on the free ends of the clamping segments, brackets are provided which extend away from the clamping segments. These brackets are engaged by bolts of a closure lever. The clamping segments in their open position in the region of the brackets are spaced apart at an interval which corresponds to the spacing of the bolts. When the closure lever is pivoted, the bolts move within the brackets. Since the spacing of the bolts is fixed, the clamping segments move during the locking process toward one another, and in the locked position, are disposed adjacent to each other. The length of the brackets is such that the open position and the locked position are precisely defined. This configuration is disadvantageous not only due to the stationary holding part but also due to the fact that the arcuate clamping segments in the locked position only overlap constantly over their circumferential length with the container edge if their articulation is already in the region of the container edge. The consequence of both is that emplacement of the cover on the container requires an unaccustomed movement parallel and perpendicular to the container axis.

SUMMARY OF THE INVENTION

It is an object of the present invention to create a pressure cooker of the above cited type whose cover offers improved operating comfort and simultaneously high locking security.

This object is achieved according to the present invention with several (in particular four) closure members that are combined into several (in particular two) groups of closure members. The closure members in the groups of closure members are connected together with hinges. The several (in particular two) ends of the two groups of closure members, in particular their adjacent two ends, during closing are simultaneously guided obliquely inwardly toward one another. During the opening, the adjacent ends are guided obliquely outward away from one another with the aid of the closing mechanism, which moves the hinges radially between the closure members.

In this way the cover can be emplaced through a simple movement coaxially to the container axis. A stationary holding segment is no longer a hindrance, and in the open position of the closing mechanism no closure member is located, not even partially, near the container edge. Rather, only after the cover has been placed perpendicularly onto the container and the sealing ring has been lightly compressed, are the closure members moved into the locked position. In the locked position the closure members overlap the container edge, and uniformly overlap the container edge over their entire length.

In a special embodiment of the invention the oblique guidance of the ends of the several (in particular two) groups of closure members takes place with the aid of a pin/slot combination, a track-guided and/or a rotating track (guides) which are simple and work reliably. The pins can be provided in the slots in the cover as a component of the closing mechanism on the closure members.

The closing mechanism is advantageously actuated by a central actuation knob and/or an actuation device in the proximity of the edge, for example via a rotating track. The rotating track, while a simple structure, permits simultaneous comfortable operation of the closing mechanism.

In a further embodiment of the invention the closure members are supported in a cavity having a U cross-sectional shape, preferably closed toward the outside, on the periphery of the cover so that the closure members are not visible from the outside.

The closure members are therein guided radially, for example on the circumference (periphery) of the cover, and preferably in the U section-shaped cavity of the cover in order to ensure reliable functioning of during closing and unlocking.

In particular the closure members can themselves be U-shaped sections with low weight, which are open towards the container axis. A lower flange of the U-shaped section is intended for extending under the container edge and is preferably longer than an upper flange so that with the free displacement path for the closure members, the lower flange of the U-shaped section always extends securely under the container edge.

BRIEF DESCRIPTION OF THE DRAWINGS

Further goals, characteristics, advantages and application capabilities of the invention are evident in the following description of embodiments in conjunction with the drawings. Therein all described and/or graphically depicted characteristics by themselves or in any combination form the subject matter of the invention even independently of their combination in individual claims.

The drawings depict.

DESCRIPTION OF THE PREFERRED EMBODIMENTS

Figure 1A:
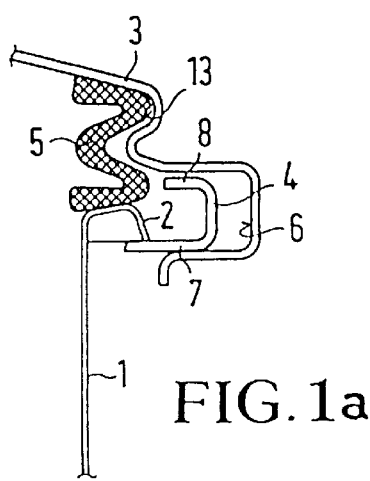
FIGS. 1*a* and 1*b* schematically depict a partial vertical section of a pressure cooker comprising the invention in the region of a container edge, wherein closure members in FIG. 1*a* are in a locked position and in FIG. 1*b* are in an open position.
Figure 1B:
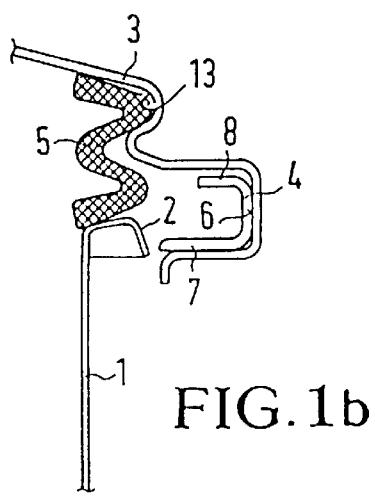

A pressure cooker depicted in the drawings comprises a container 1 intended for receiving items to be cooked, and a cover 3 which can be placed on a container edge 2 and locked with it in order to airtightly close the cooker. The container edge 2 is bent outwardly. The cover 3 is equipped with a closing mechanism which, according to FIGS. 2a and 2b, comprises four closure members distributed over the periphery of the cover 3. Closure members 4 are arcuately adapted to the circumferential contour of the container edge 2, are in segments, and are supported displaceably or pivotably on the periphery of the cover 3. The closure members 4 can be moved by an actuation device (for example disposed centrally) from an open position, in which the cover 3 can be removed from the container 1 (FIGS. 1b and 2b), into a locked position, in which the cover 3 is pressed at its periphery by interspacing an encircling sealing ring 5 against the container edge 2. The closure members 4 extend in their locked position under the container edge 2 and press the sealing ring 5 against the container edge 2. The sealing ring 5 is formed in a corrugated form and held detachably with an upper arch segment in a correspondingly formed groove 13 of the cover 3.

According to the invention the overall four closure members 4 are combined in two groups of two closure members 4 each, and are connected with one another via one hinge 10 for each group. Two adjacent ends 9 of the two groups of closure members 4, with the aid of the closing mechanism that moves the hinges 10 between the closure members 4 radially inwardly or outwardly, can be guided simultaneously together during closure obliquely inwardly toward one another, and during opening, obliquely outwardly away from one another. In this way the closure members 4 can be moved from a position (open position) in which they do not overlap the container edge at all into another position (locked position) in which they extend under the container edge 2 on its periphery with a uniform space between the closure member-edge and the container edge. In the locked position the flow of force takes place from the container edge 2 over the closure members 4 onto the cover 3.

Figure 2A:
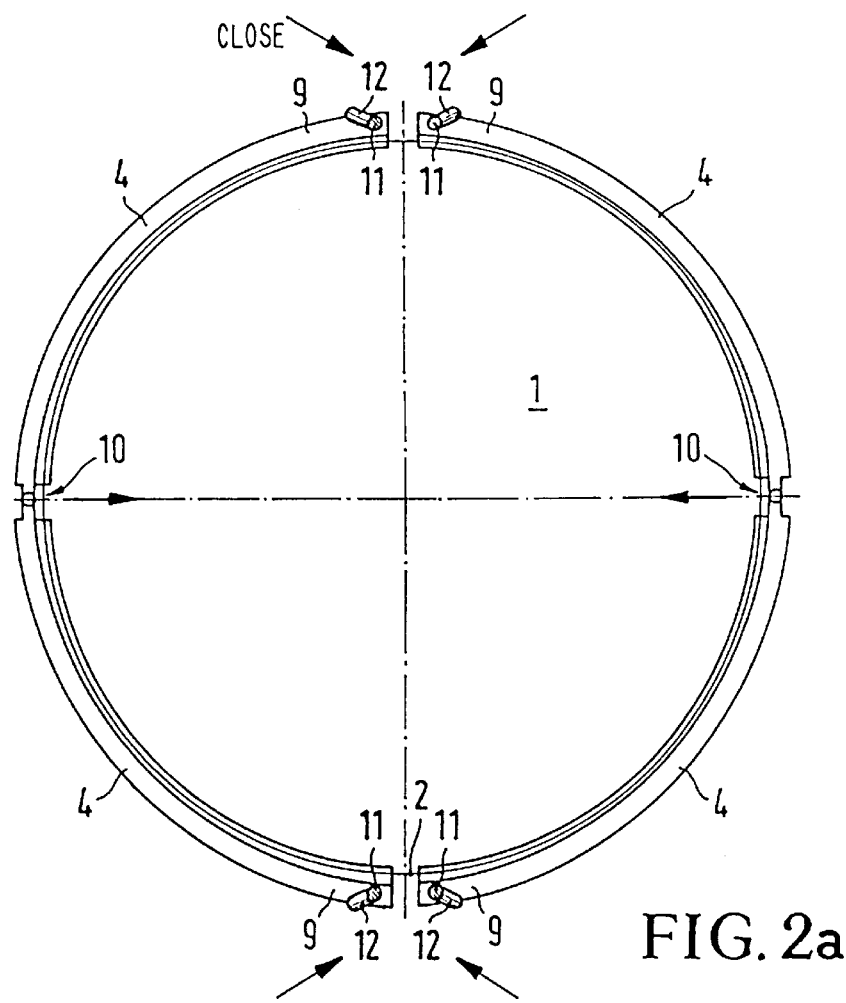
FIGS. 2*a* and 2*b* schematically depict a container of FIGS. 1*a* and 1*b* in a top view wherein the relative positions of the closure members with respect to the container edge are shown, and specifically in the locked position (FIG. 2*a*) and in the open position (FIG. 2*b*).
Figure 2B:
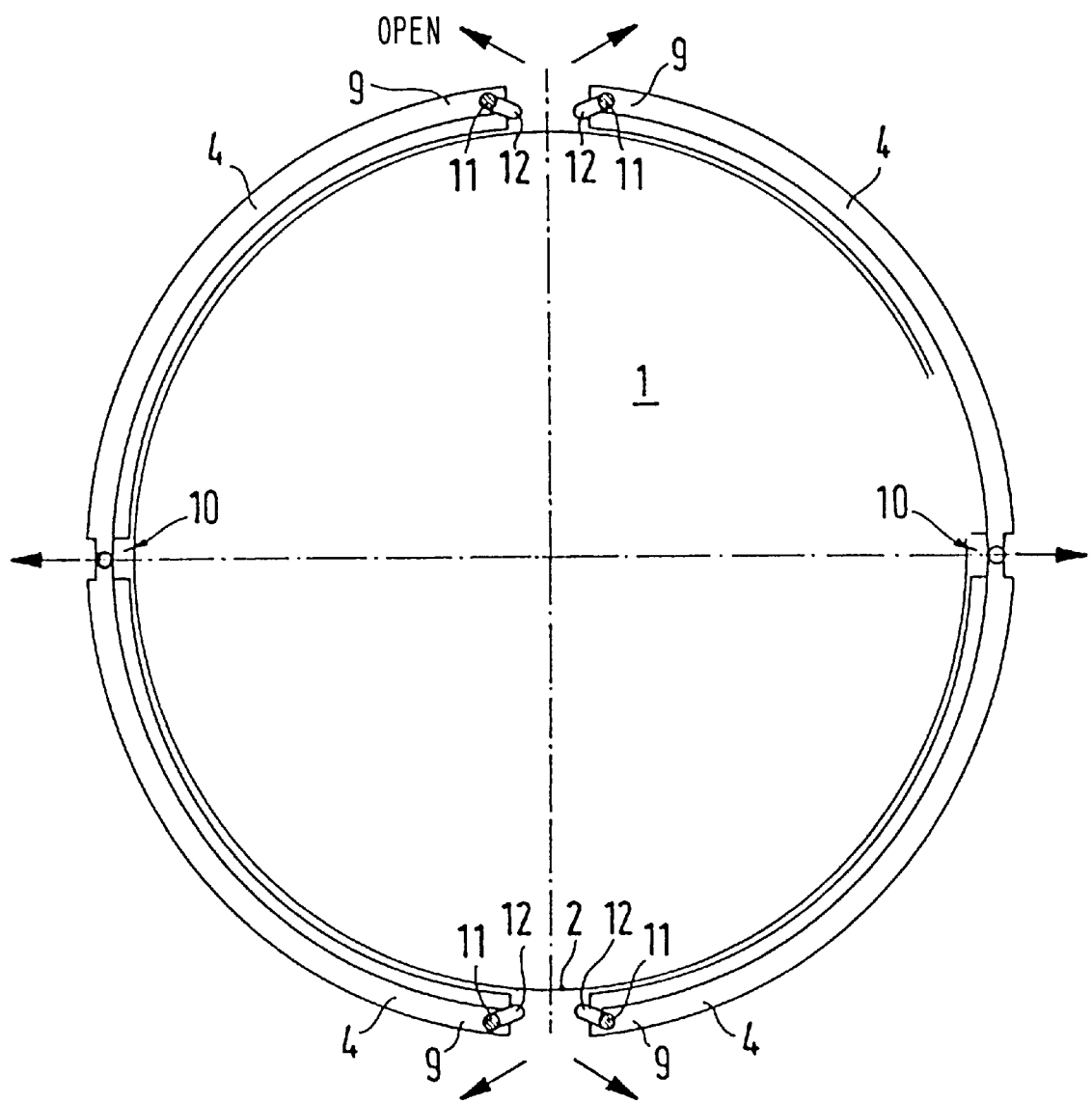

In FIGS. 2a and 2b, the direction of movement, in which the individual parts of the closure members 4 move relative to the container edge 2 during closing or opening, is indicated by arrows. It can be seen that the oblique guidance of the ends 9 of the groups of closure members 4 takes place with the aid of a pin/slot combination 11, 12. The pins 11 are provided as components of the closing mechanism on the closure members 4, and the slots 12 are provided in the cover 3. The closing mechanism (not indicated in the drawing) can comprise at least one rotary track operatable by a central actuation knob. Depending on the direction of rotation of the knob, the closure members 4 can be moved in the indicated directions of movement into the locked position as well as also into the open position.

The closure members 4 are supported in a U section-shaped cavity 6 (open toward the inside) on the periphery of the cover 3 so that the closure members 4 are not visible from the outside. The closure members 4 can therein be guided radially on the periphery of the cover 3, and in particular in the U section-shaped cavity 6 of the cover 3.

The closure members 4 themselves are also implemented as a U-shaped section open toward the container axis. A lower flange 7 of the U-shaped section is intended for extending under the container edge 2 and is longer than an upper flange 8 so that the particular closure members 4, without impairing the movement path in the region of the upper flange 8, can be moved into a secure overlap state with the container edge 2, and a secure locking and sealing of the pressure cooker over the entire container circumference takes place.

What is claimed is:

1. A pressure cooker comprising:
 a container for receiving items to be cooked, wherein said container includes an outwardly bent container edge having a circumferential contour;
 a cover adapted to be supported on said container edge, wherein said cover includes a periphery;
 a closing mechanism provided on said cover, wherein said closing mechanism includes
  at least two groups of closure members, wherein each said group includes at least two closure members pivotally connected together and pivotally mounted on said periphery of said cover, wherein said closure members are arcuately adapted to said circumferential contour of said container edge, and
  at least two closure member guides provided in relation to said at least two groups such that at least two adjacent ends of said at least two groups are guided simultaneously by said guides obliquely inwardly towards one another during closing and obliquely outwardly from one another during opening; and
 an encircling seal ring provided on said cover and adapted to be pressed against said container edge.

2. A pressure cooker according to claim 1, wherein said guides include a pin/slot combination.

3. A pressure cooker according to claim 2, wherein said pin/slot combination includes at least four pins provided on each of said at least four closure members, and at least four slots provided in said cover for guiding said pins.

4. A pressure cooker according to claim 1, wherein said guides include a track-guided device having slots provided in said cover for guiding said adjacent ends, and wherein said closing mechanism includes a rotating device coupled to said track-guided device for moving said closure members.

5. A pressure cooker according to claim 4, wherein said rotating device includes a central actuation knob provided on said cover for moving said closing members.

6. A pressure cooker according to claim 1, wherein said closing mechanism includes a central actuation knob for moving said closing members.

7. A pressure cooker according to claim 1, wherein said closing mechanism includes an actuation device disposed on said cover proximal to said container edge.

8. A pressure cooker according to claim 1, wherein said cover includes an outwardly closed U-shaped cavity provided on said periphery of said cover, and wherein said closure members are supported in said U-shaped cavity.

9. A pressure cooker according to claim 1, wherein said cover includes a U-shaped cavity provided on said periphery of said cover, and wherein said closure members are radially guided in said U-shaped cavity.

10. A pressure cooker according to claim 1, wherein each of said closure members has a U-shaped cross-section.

11. A pressure cooker according to claim 10, wherein said container has a container axis, and wherein said U-shaped section is open towards said container axis.

12. A pressure cooker according to claim 11, wherein each of said closure members includes an upper flange and a lower flange, wherein said lower flange is adapted to extend under said container edge, wherein said lower flange is longer than said upper flange.

13. A pressure cooker cover assembly comprising:
 a cover including a periphery; and
 a closing mechanism provided on said cover, wherein said closing mechanism includes at least four arcuately shaped closure members pivotally mounted on said periphery of said cover, and at least two groups of said closure members, wherein each said group includes at least two of said closure members pivotally connected together.

14. A pressure cooker cover assembly according to claim 13, wherein said closing mechanism includes at least two closure member guides provided in relation to said at least two groups such that at least two adjacent ends of said at least two groups are guided simultaneously by said guides obliquely inwardly towards one another during closing and obliquely outwardly from one another during opening.

15. A pressure cooker cover assembly according to claim 14, wherein said guides include at least four pins provided on each of said at least four closure members, and at least four slots provided in said cover for guiding said pins.

16. A pressure cooker cover assembly according to claim 13, further comprising a seal ring provided on said cover.

17. A pressure cooker cover assembly according to claim 16, wherein said cover includes a groove, and wherein said seal ring is detachably held in said groove.

18. A pressure cooker cover assembly according to claim 13, wherein said closing mechanism includes a central actuation knob provided on said cover for moving said closing members.

19. A pressure cooker cover assembly according to claim 13, wherein said cover includes a U-shaped cavity provided on said periphery of said cover, and wherein said closure members are supported in said U-shaped cavity.

20. A pressure cooker cover assembly according to claim 13, wherein each of said closure members includes an upper flange and a lower flange for extending under said container edge, wherein said lower flange is longer than said upper flange.

* * * * *